W. I. & J. W. MILLER.
HORSESHOE CALK.
APPLICATION FILED DEC. 6, 1912.

1,075,263.

Patented Oct. 7, 1913.

WITNESSES
Oliver W. Holmes
A. L. Kitchin

INVENTORS
WILLIAM I. MILLER,
JESSE W. MILLER,
BY Munn & Co
ATTORNEYS

UNITED STATES PATENT OFFICE.

WILLIAM I. MILLER AND JESSE W. MILLER, OF RED WING, MINNESOTA.

HORSESHOE-CALK.

1,075,263. Specification of Letters Patent. Patented Oct. 7, 1913.

Application filed December 6, 1912. Serial No. 735,254.

*To all whom it may concern:*

Be it known that we, WILLIAM I. MILLER and JESSE W. MILLER, both citizens of the United States, and residents of Red Wing, in the county of Goodhue and State of Minnesota, have invented a new and Improved Horseshoe-Calk, of which the following is a full, clear, and exact description.

This invention relates to improvements in horseshoe calks, and has for an object to provide an improved toe calk designed to be easily applied and removed, while presenting all of the advantages of a perfectly solid construction.

Another object of the invention is to provide a calk formed with a plurality of parts removably connected with a shoe and formed with slots having beveled ends, which slots are adapted to receive a biting blade, the construction of the biting blade with the beveled ends and the beveled ends of the receiving slots presenting means which cause the blade to remain properly in place and to fit properly in place even though the parts of the calk may be set somewhat inaccurately.

A still further object of the invention is to provide a removable calk having an extension on each side for more properly supporting the horse's foot when the horse does not correctly set his foot down.

In carrying out the objects of the invention, a pair of removable calk structures are provided, which are preferably formed with threaded extensions fitting into threaded apertures in the horseshoe so as to be held properly in place. These members are provided with slots having beveled end walls which co-act with a thin blade of comparatively hard material so as to properly engage the ground and act continuously as a sharp engaging point, the remaining part of the calk wearing off more rapidly than this particular hardened plate. The ends of the calk are also preferably extended outwardly an appreciable distance so as to cause a horse to place his foot on the ground properly or straight and level, in case he is inclined to do otherwise.

A practical embodiment of the invention is represented in the accompanying drawings forming a part of this specification, in which similar characters of reference indicate corresponding parts in all the views.

Figure 1:
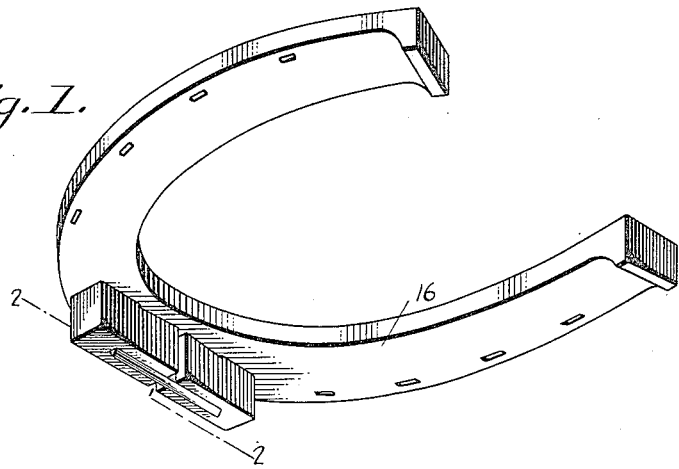
Figure 2:
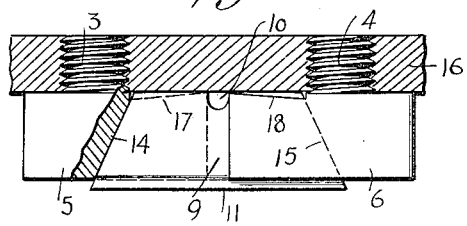
Figure 4:
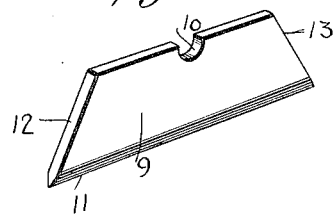
Figure 3:
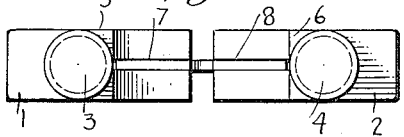

Figure 1 is a perspective view of a horseshoe calk disclosing an embodiment of the invention; Fig. 2 is a section through Fig. 1 approximately on the line 2—2; Fig. 3 is a bottom plan view of the calk removed; Fig. 4 is a detail perspective view of the biting plate; and Fig. 5 is a perspective view of a slightly modified form of calk.

In forming the calk, the same is provided with extensions 1 and 2, which may project any desired distance beyond the threaded extensions 3 and 4 so as to provide an outward projection for causing the horse to place his feet properly on the ground. It will be evident that if desired only one of the extensions 1 and 2 could be used at any time. If a horse in walking does not place his foot properly on the ground, the use of the extensions 1 and 2, or one of these extensions, is intended to make him set his foot straight and level in case he is inclined to do otherwise.

The threaded extensions 3 and 4 merge into parts 5 and 6 which extend toward each other when in position, as shown in Figs. 1 and 2, but do not meet, whereby an opening is provided therebetween. Slots 7 and 8 are provided in parts 5 and 6, for accommodating a biting plate 9. The biting plate 9 is formed with a notch 10, biting edge 11, and beveled ends 12 and 13. The beveled ends 12 and 13 of plate 9 are adapted to engage the beveled ends 14 and 15 respectively of the slots 7 and 8. This is of considerable advantage in properly fitting the calk in place. If, for instance, the threaded apertures in the shoe 16 should not be spaced correctly, the bevel of the ends of plate 9 will take up any slight inaccuracies so that the plate will properly fit in place and will be wedged tightly in place by the weight of the horse during the use of the calk. It will be noted that the parts 5 and 6 are cut away at points 17 and 18. This allows the parts 5 and 6 to be locked properly until the same are perfectly tight before the biting plate 9 is placed in position. This is of advantage in that it permits the parts 5 and 6 to be screwed down tightly against the horseshoe. In the manufacture of horseshoes and also of calks the same are not machined off absolutely perfect. This will result in the poor fit of the calk unless especial care is taken to properly see that the calk is seated. By forming the cutaway portions 17 and 18 the parts 5 and 6 of the calk may be screwed down tightly against the horseshoe, so that the pressure will be transmitted through the parts 5 and 6 to the horseshoe directly, instead of through the threaded extensions. It will also be noted that notch 10 is arranged to register with the opening between members 5 and 6 so that a tool may be placed therein when it is desired to remove the plate.

Figure 5:
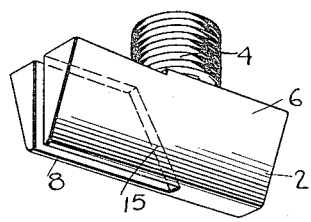

In constructing the parts 5 and 6, the same may be made perfectly straight up and down or square, as shown in Figs. 1 and 2, or made beveled as shown in Fig. 5. Also if desired, the parts 5 and 6 could be inclined or pitched toward the front of the shoe 16. A horse in starting to pull, rises on his toes and his heel is off the ground so that the calk when formed as shown in Figs. 1 and 2, or pitched to the front, will be substantially perpendicular to the ground or will be at a slight biting angle. Further slight changes may be made without departing from the spirit of the invention, as for instance the extensions could be eliminated, or could be, as above stated, made longer if desired, and the calk caused to be inclined or pitched toward the front instead of square or perpendicular to the shoe 16. In any of the various slight changes, however, the slots 7 and 8 are maintained, together with the beveled walls 14 and 15, so that the plate 9 may properly fit in place even though the threaded extensions 13 and 14 are placed slightly incorrectly. The material of which the members 5 and 6 are made is preferably softer and will wear away quicker than the plate 9, which is preferably formed of hard metal. As the plate 9 is a comparatively thin sheet, a biting edge will be continually presented so that the calk will not only act as a proper balancing support, but will properly bite or pinch against the ground for preventing slipping.

Having thus described our invention, we claim as new and desire to secure by Letters Patent:—

1. In a horseshoe calk, a pair of rotatable members threaded into a horseshoe, each of said members being formed with a slotted portion extending toward the opposite member and also extending from the bottom of the calk toward the horseshoe, each of said slots being beveled at the end, the bevel extending from the bottom of the calk toward the horseshoe, and a strip of material having beveled ends positioned in said slots, and acting on said beveled ends of said slots, whereby the strip is properly fitted in position and acts as a lock for preventing the rotation of the rotatable members.

2. In a horseshoe calk, a pair of rotatable members formed with vertical, longitudinal facing slots, each of said slots having a beveled end extending from the bottom of the rotatable member toward the horseshoe, and a hardened strip of material arranged into said slot and connecting said rotatable members, said hardened strip being formed of a thin sheet with beveled ends co-acting with the beveled ends of said slots, said strip of hardened material being formed with a notch acting as a key-receiving portion for permitting a key to force said strip of material out of said slot.

3. In a horseshoe calk, a pair of rotatable members removably connected with a horseshoe, each of said members being formed with a body extending on opposite sides of the securing point thereof, one side of each of said rotatable members being formed with a slot extending from the bottom toward the horseshoe, and each of the slots being formed with a beveled end, and a strip of hardened material conforming substantially with the shape of both of the slots, for connecting said rotatable members, said beveled ends causing said strip of hardened material to properly fit notwithstanding a slight difference in size between the same and said slot.

In testimony whereof we have signed our names to this specification in the presence of two subscribing witnesses.

WILLIAM I. MILLER.
JESSE W. MILLER.

Witnesses:
L. C. MEYER,
W. A. GIFFIN.

---

Copies of this patent may be obtained for five cents each, by addressing the "Commissioner of Patents, Washington, D. C."